(12) United States Patent
Kim et al.

(10) Patent No.: US 8,102,477 B2
(45) Date of Patent: Jan. 24, 2012

(54) STEREOGRAPHIC IMAGING DEVICE WITHOUT IMAGE MIRROR AND THE MANUFACTURING METHOD THEREOF

(75) Inventors: Jung Hoi Kim, Gwangju (KR); Hoi Jin Ha, Seoul (KR)

(73) Assignee: Redrover Co., Ltd., Seongnam-Si, Gyeonggi-Do (KR)

( * ) Notice: Subject to any disclaimer, the term of this patent is extended or adjusted under 35 U.S.C. 154(b) by 494 days.

(21) Appl. No.: 12/310,792

(22) PCT Filed: May 10, 2007

(86) PCT No.: PCT/KR2007/002316
§ 371 (c)(1),
(2), (4) Date: Mar. 6, 2009

(87) PCT Pub. No.: WO2008/029984
PCT Pub. Date: Mar. 13, 2008

(65) Prior Publication Data
US 2009/0316059 A1    Dec. 24, 2009

(30) Foreign Application Priority Data
Sep. 8, 2006   (KR) .................. 10-2006-0086675

(51) Int. Cl.
*G02F 1/1335*   (2006.01)
*G02F 1/13*     (2006.01)

(52) U.S. Cl. ......................................... 349/15; 349/187
(58) Field of Classification Search .................... 349/15, 349/187
See application file for complete search history.

(56) References Cited

U.S. PATENT DOCUMENTS
5,598,282 A * 1/1997 DeGroof ........................ 349/15
* cited by examiner

*Primary Examiner* — Nathanael R Briggs
(74) *Attorney, Agent, or Firm* — The Nath Law Group; Jerald L. Meyer; Robert T. Burns

(57) ABSTRACT

The present invention discloses a stereoscopic imaging device with no need for an image mirror circuit, including a first display device comprising a LCD panel, and a backlight disposed toward a rear surface of the LCD panel and configured to supply lighting to the LCD panel, wherein two polarization filters having a polarization angle difference of 90 degrees are attached to front and rear surfaces the LCD panel; a second display device having a type in which the LCD panel is rotated 180 degrees with its top and bottom remaining intact and the backlight is positioned on the front surface of the LCD panel in the first display device, the second display device being disposed at an angle of 90 degrees with respect to the first display device; and a half mirror disposed at an angle of 45 degrees with respect to the first display device and the second display device between the first display device and the second display device.

5 Claims, 4 Drawing Sheets

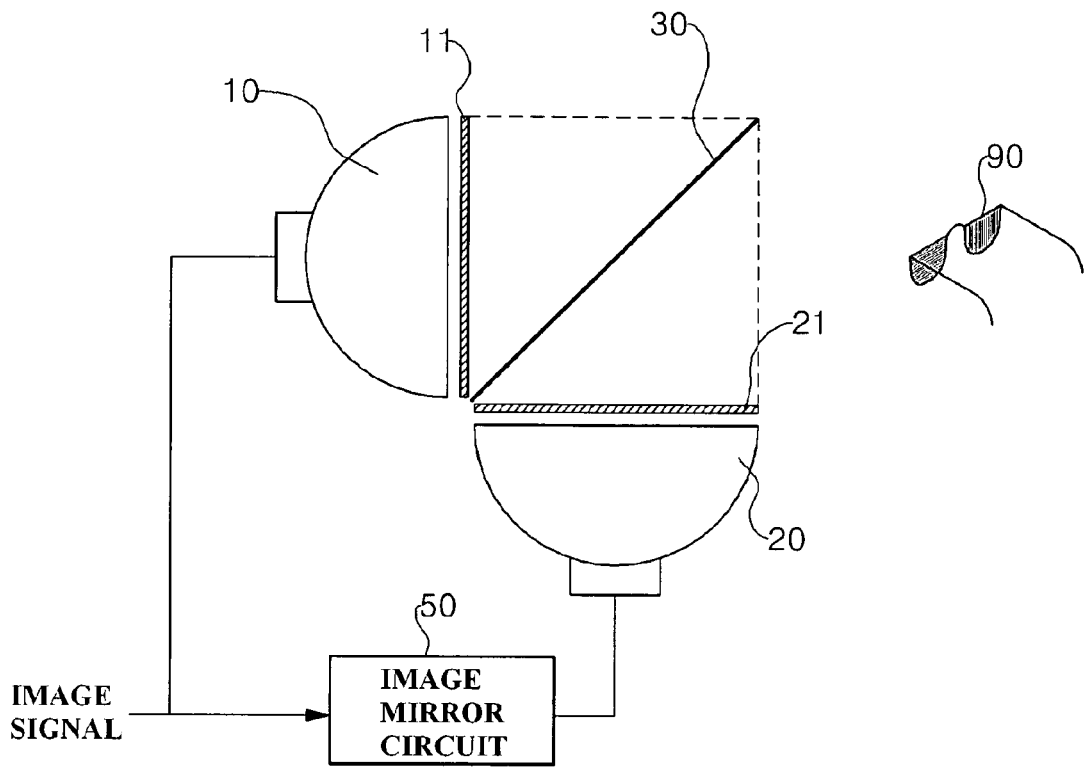
[Fig. 1]
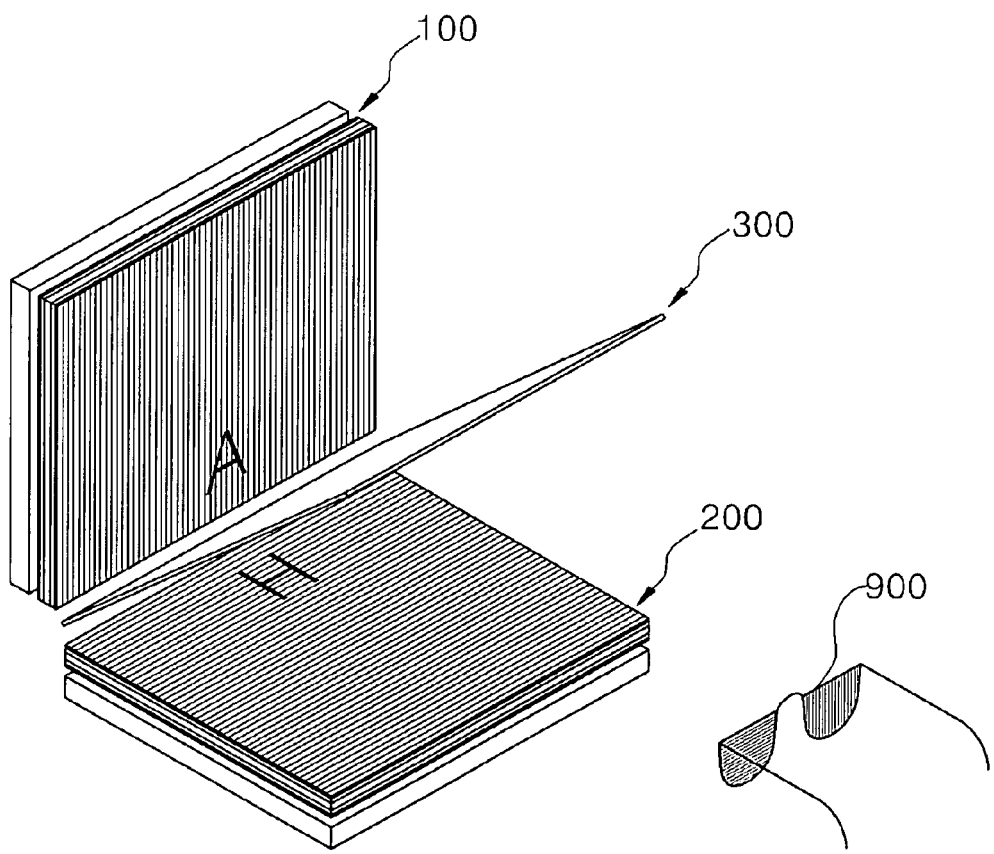
[Fig. 2]

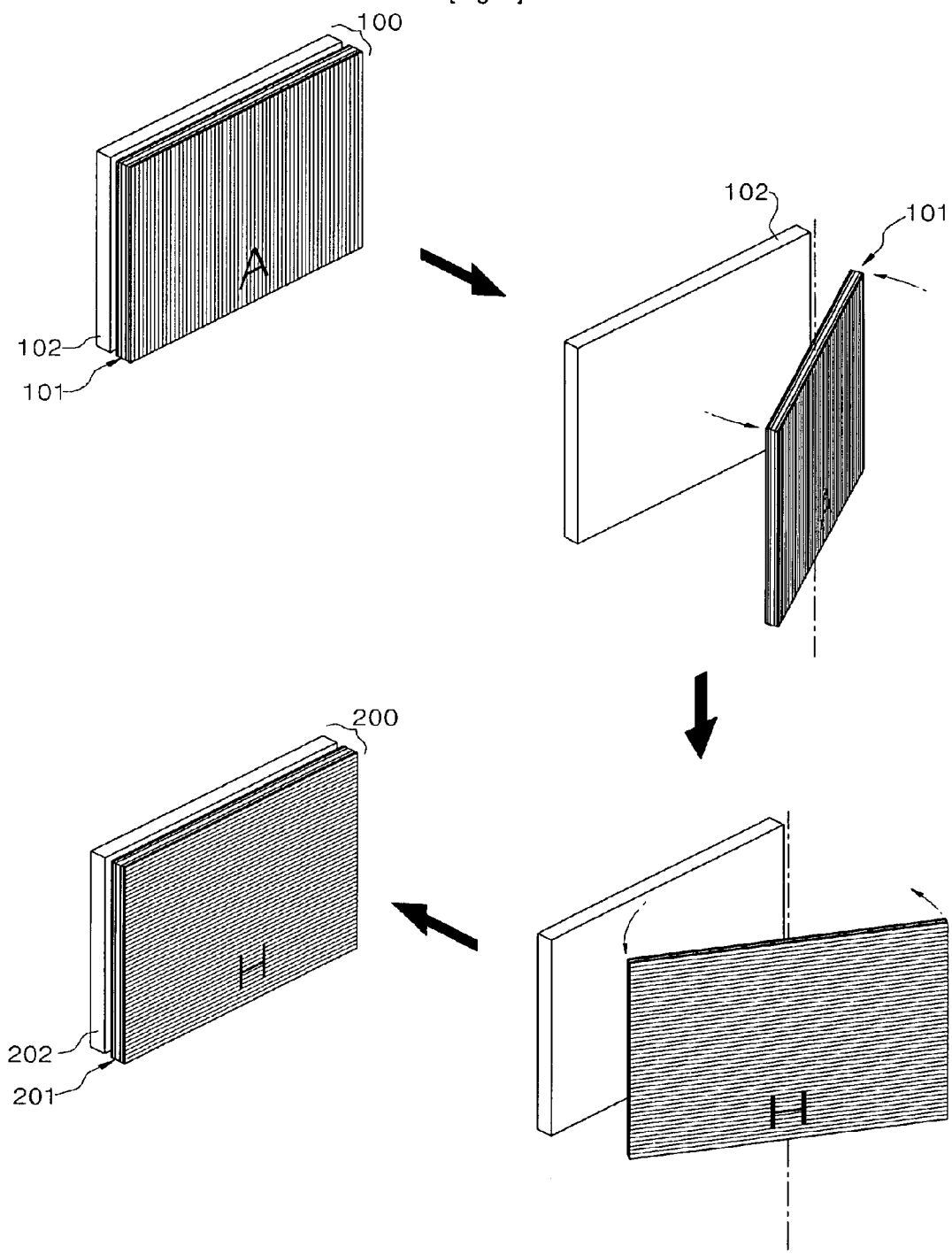

[Fig. 4]
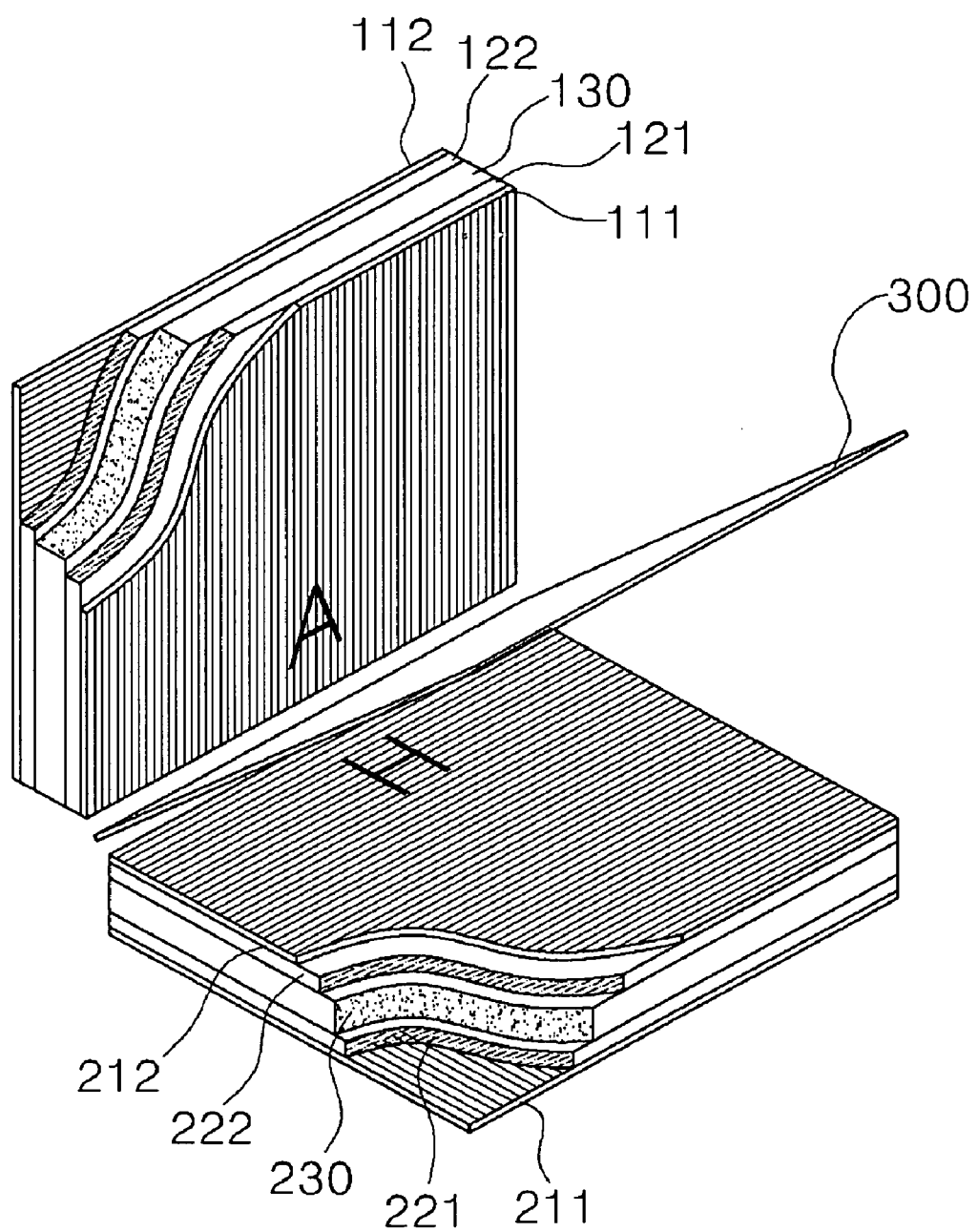

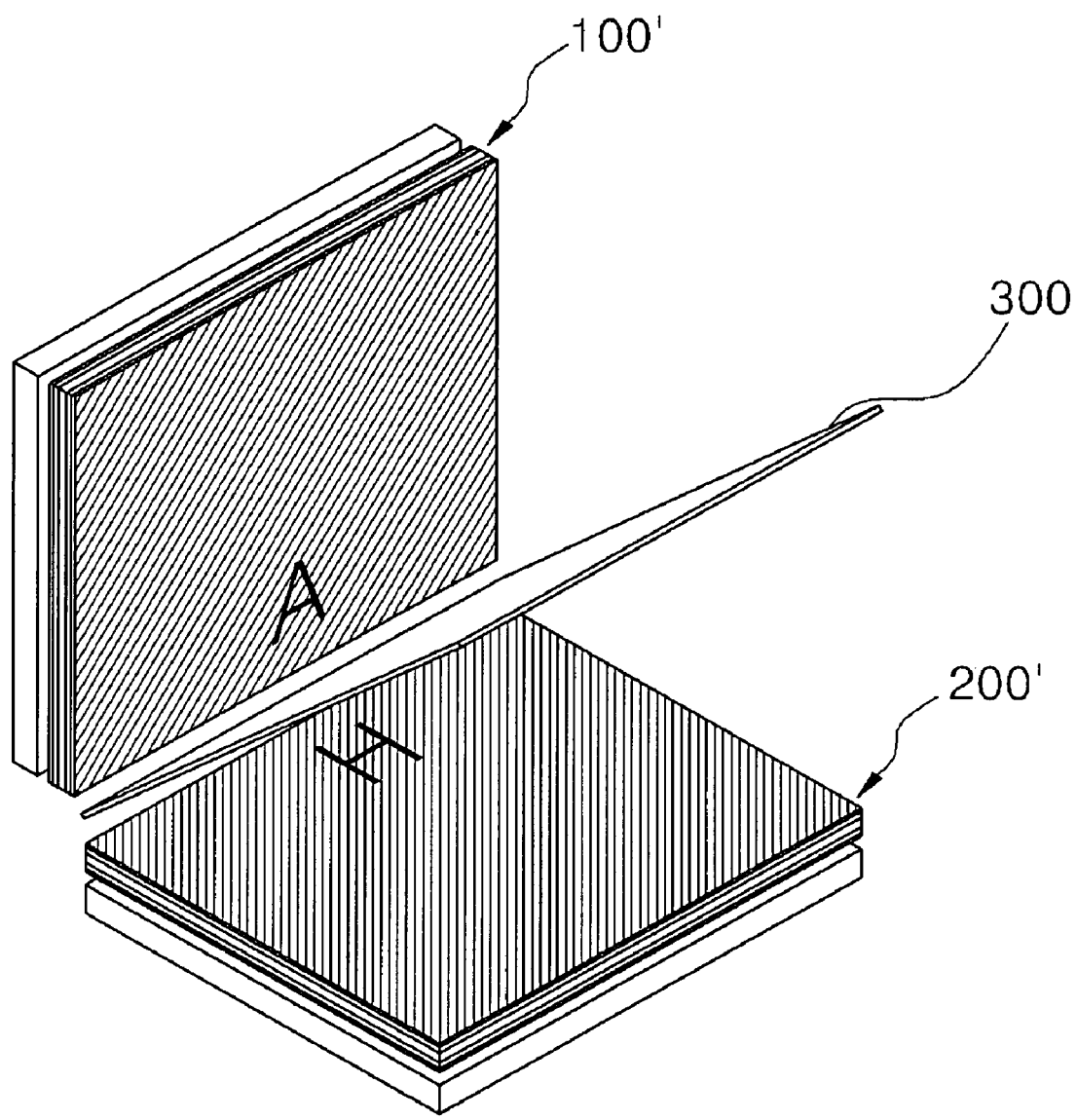
[Fig. 5]

STEREOGRAPHIC IMAGING DEVICE WITHOUT IMAGE MIRROR AND THE MANUFACTURING METHOD THEREOF

TECHNICAL FIELD

The present invention relates to a stereoscopic imaging device, and more particularly, to a stereoscopic image capturing device in which a process of attaching a polarization filter again is not necessary by employing LCD panels having the same polarization angle and an image mirror circuit is not necessary since one LCD panel is turned over and installed.

BACKGROUND ART

A stereoscopic imaging device can be largely classified into a stereoscopic method and an autostereoscopic method.

The autostereoscopic method is a method of dividing left and right images spatially at a viewer's eye position and outputting the images. Representative examples of the autostereoscopic method include a lenticular method and a barrier method. The autostereoscopic method is very convenient because it does not use glasses, but has a phenomenon in which a stereoscopic image is interrupted when moving left and right and forward and rearward. The autostereoscopic method is also disadvantageous in that resolutions are inevitably lowered since a composed left and right image is output using one display.

The stereoscopic method is disadvantageous in that glasses serving as an optical filter must be worn, but is advantageous in that it is excellent in comparison with the autostereoscopic method in terms of the viewing angle or resolutions. Although stereoscopic imaging devices of various stereoscopic methods have been proposed, most of them use a polarization method. In the prior art, of the stereoscopic methods, a method in which position limits are relatively free, the highest resolution is supported, and two CRT monitors and a half mirror are used as shown in FIG. 1 was used a lot.

This method employs two CRT monitors one of which is for the left eye and the other of which is for the right eye. The method is configured to output picture signals captured by the CRT monitors and combine left and right images to the front through the half mirror, so that a stereoscopic image can be enjoyed using polarized glasses.

FIG. 1 is a view illustrating a construction of a conventional stereoscopic imaging device employing two CRT monitor.

Referring to FIG. 1, the conventional stereoscopic imaging device employing the two CRT monitors includes two CRT monitors 10, 20, polarization filters 11, 21 disposed in front of the CRT monitors 10, 20, respectively, and a half mirror 30 disposed at an angle of 45 degrees with respect to the front side of each of the monitors 10, 20 between the two CRT monitors 10, 20.

In the stereoscopic imaging device constructed above, the following two requirements must be met.

One of the requirements is that a phase difference of a polarization film adhered to each monitor must be 90 degrees, and the other of them is that an image mirror function for turning over left and right sides in order to correct an image must be implemented in an input signal stage because an image on a lower side is output by the half mirror with the left and right sides changed.

This method using the two monitors is advantageous in that a high-resolution stereoscopic image without image loss can be seen since left and right images are output from the respective monitor and combined in the space.

However, this method is disadvantageous in that it has a very large volume because the CRT monitors are used.

In order to supplement the disadvantage of the large volume due to the use of the conventional CRT monitors, a stereoscopic imaging device using two Thin Film Transistor Liquid Crystal Displays (TFT-LCD) having self-polarization filters attached thereto was proposed. The TFT-LCD is one of the widely used display devices in the field of flat displays since it enables direct IC driving because of low consumption power of several to several tens of □/□ and a low voltage operation and it is thin and light and can have a large-sized screen. However, most LCDs have the polarization filter attached thereto and are therefore problematic in that they do not satisfy the polarization orthogonality condition in which the phase difference of the polarization film attached to each monitor must be 90 degrees.

In order to solve the problems, applications regarding a variety of methods were filed. Japanese Patent Application no. 1996-116679 discloses a stereoscopic imaging device in which a liquid crystal display device having a polarization direction of a vertical axis x is a 'normally white type' and a liquid crystal display device having a polarization direction of a horizontal axis y is a 'normally black type'.

The normally white type is of a type in which light can transmit in a normal state where voltage is not supplied to liquid crystal, and the normally black type is of a type in which light can transmit when voltage is supplied to liquid crystal.

The reason why different types of the liquid crystal display devices are used is that mutual perpendicularity could not be accomplished between types in which polarization directions of polarization filters in the existing liquid crystal display device are different. If different types of the liquid crystal display devices are used as described above, there are disadvantages in that a driving method is complicated and a lot of power consumption is needed because the two liquid crystal display devices must be switched in opposite directions. Furthermore, the normally white type and the normally black type have different output characteristics. For example, the normally black type has a low contrast ratio due to the occurrence of light leakage when a light source having a wide wavelength range is used as rear-surface light and therefore is problematic in that the picture quality of left and right images has a different characteristic.

As a method for solving the problem in which the picture quality of left and right images has a different characteristic, Korean Patent Application No. 1999-0049331 was filed. In this patent application, an attempt was made to prevent a reduction of a three-dimensional effect caused by the picture quality difference of left and right images, which occurs due to the use of LCD panels with different characteristics, so as to produce orthogonally polarized light. In other words, in order for polarization directions to be vertical to each other while using two sheets of the same normally black types as LCD panels, polarization filters on both sides of one of liquid crystal display devices is detached, and rotated 90 degrees in the same direction and then attached again.

However, this method is advantageous in that it uses the same panel, but cannot obtain an optimal design and performance of an original liquid crystal panel and, in even worse cases, may have a detrimental result in which an image output itself may become problematic because only the front and rear polarization filters are detached and then attached again at an angle of 90 degrees with no regard for the characteristics of the existing liquid crystal.

Further, there still remains a problem that image inversion must be performed although the polarization filters are attached again and used for the purpose of the orthogonal polarization condition.

DISCLOSURE OF INVENTION

Technical Problem

The present invention has been made to solve the problems, and an object of the present invention is to provide a stereoscopic imaging device, wherein it fulfills the orthogonal polarization condition and also does not need image inversion, although two liquid crystal display devices of the same method are used, and a method of fabricating the same.

Technical Solution

To achieve the above object, a construction of the present invention includes a first display device comprising a LCD panel, and a backlight disposed toward a rear surface of the LCD panel and configured to supply lighting to the LCD panel, wherein two polarization filters having a polarization angle difference of 90 degrees are attached to front and rear surfaces the LCD panel; a second display device having a type in which the LCD panel is rotated 180 degrees with its top and bottom remaining intact and the backlight is positioned on the front surface of the LCD panel in the first display device, the second display device being disposed at an angle of 90 degrees with respect to the first display device; and a half mirror disposed at an angle of 45 degrees with respect to the first display device and the second, display device between the first display device and the second display device.

In a preferred embodiment, the LCD panel of the first display device has the front surface to which the polarization filter of 45 degrees is attached and the rear surface to which the polarization filter of 135 degrees is attached.

In a preferred embodiment, the LCD panel of the first display device has the front surface to which the polarization filter of 90 degrees is attached and the rear surface to which the polarization filter of 0 degrees is attached.

In a preferred embodiment, a picture signal input to the first display device is the same signal as that input to the second display device.

To achieve the above object, a fabrication method of the present invention provides a method of fabricating a stereoscopic imaging device using two LCD panels and a half mirror disposed between the LCD panels, including a first step of disposing a first LCD panel having a first front polarization filter and a first rear polarization filter on one surface of the stereoscopic imaging device so that the first front polarization filter is directed towards the half mirror; a second step of disposing a second LCD panel at a predetermined angle with respect to the first LCD panel, wherein the second LCD panel has a second front polarization filter and a second rear polarization filter having polarization angles of the same pattern as that of the first front polarization filter and the first rear polarization filter of the first LCD panel, respectively; and a third step of disposing a half mirror between the first LCD panel and the second LCD panel, wherein the second step includes disposing the second LCD panel by rotating the second LCD panel 180 degrees with its top and bottom remaining intact so that the second rear polarization filter is directed towards the half mirror direction.

In a preferred embodiment, the second step includes disposing the second LCD panel at an angle of 90 degrees with respect to the first LCD panel, and the third step includes disposing the half minor so that the half mirror form an angle of 45 degrees with respect to the first LCD panel and the second LCD panel, respectively.

In a preferred embodiment, the first step includes using a polarization filter having a polarization angle of 90 degrees as the first front polarization filter, and a polarization filter having a polarization angle of 0 degree as the first rear polarization filter.

In a preferred embodiment, the first step includes using a polarization filter having a polarization angle of 135 degrees as the first front polarization filter, and a polarization filter having a polarization angle of 45 degree as the first rear polarization filter.

In a preferred embodiment, the step of transmitting the same picture signal input to the first display device and the second display device in order to show a stereoscopic image to a user is further included.

Advantageous Effects

As described above, according to the present invention, after polarization filters attached to a LCD panel of a display device are detached, it is not necessary to attach the filters again. Accordingly, there is an advantage in that a fabrication process can be simplified.

Further, in the conventional stereoscopic imaging device, a picture signal input to a second display device through an image mirror circuit was the resulting signal of a picture signal input to a first display device, which passes through the image mirror circuit. However, in the stereoscopic imaging device according to the present invention, a LCD panel of a second display device is rotated 180 degrees, and an image displayed on the second display device has its left and right sides inversed, of an image displayed on a first display device. Accordingly, an additional image mirror circuit is not required.

Therefore, according to the present invention, since the image mirror circuit is not required, the same signal as a picture signal input to the first display device, which does not pass through the image mirror circuit, is input to the second display device.

BRIEF DESCRIPTION OF THE DRAWINGS

FIG. 1 is a view illustrating a construction of a conventional stereoscopic imaging device employing two CRT monitor;

FIG. 2 is a view illustrating a construction of a stereoscopic imaging device according to a first embodiment of the present invention;

FIG. 3 is a view illustrating a process of fabricating a second display panel of FIG. 2;

FIG. 4 is a view illustrating a structure of LCD panels of FIG. 2; and

FIG. 5 is a view illustrating a construction of a stereoscopic imaging device according to a second embodiment of the present invention.

In the drawings according to the present invention, the same reference numerals will be used to refer to the same constituent elements substantially having the same construction and function.

DESCRIPTION OF REFERENCE NUMERALS OF PRINCIPAL ELEMENTS IN THE DRAWINGS

100: first display device 101: first LCD panel
201: second LCD panel 102, 202: backlight
111: first front polarization filter 112: first rear polarization filter
121, 122, 221, 222: electrode glass sheet
130, 230: liquid crystal layer
200: second display device 211: second front polarization filter
212: second rear polarization filter
300: half mirror 900: polarized glasses

BEST MODE FOR CARRYING OUT THE INVENTION

The present invention will now be described in detail in connection with embodiments with reference to the accompanying drawings.

FIG. 2 is a view illustrating a construction of a stereoscopic imaging device according to a first embodiment of the present invention. FIG. 3 is a view illustrating a process of fabricating a second display panel of FIG. 2.

Referring to the drawings, the stereoscopic imaging device according to a first embodiment of the present invention includes a first display device 100, a second display device 200, a half mirror 300 disposed between the display devices 100, 200, and polarized glasses 900.

The half mirror 300 is disposed at an angle of 45 degrees with respect to the first display device 100 and the second display device 200 between the first display device 100 and the second display device 200.

The first display device 100 includes a LCD panel, and a backlight disposed toward the rear surface of the LCD panel and configured to supply lighting to the LCD panel. Two polarization filters having a polarization angle difference of 90 degrees, such as 0 degree and 90 degrees or 45 degrees and 135 degrees, are attached to front and rear surfaces of the LCD panel. In a first embodiment of the present invention, the two polarization filters having polarization angles of 90 degrees and 0 degree are attached to front and rear surfaces of a LCD panel 101 of the first display device 100.

The second display device 200 is disposed at an angle of 90 degrees with respect to the first display device 100, and is of a type in which a backlight is turned over so that the front and rear surfaces of the LCD panel 101 of the first display device 100 are reversed.

This is described in more detail with reference to FIG. 3. The second display device 200 includes a LCD panel 201 and a backlight 202, and is of a type in which the LCD panel 101 is rotated 180 degrees with its top and bottom remaining intact and then coupled to the backlight in the first display device 100.

FIG. 4 is a view illustrating a structure of the LCD panels of FIG. 2. Referring to FIG. 4, the first LCD panel 101 of the first display device 100 includes electrode glass sheets 121, 122 disposed on both sides of a liquid crystal layer 130, and polarization filters 111, 112 attached to both sides of the electrode glass sheets 121, 122. The second LCD panel of the second display device 200 includes electrode glass sheets 221, 222 disposed on both sides of a liquid crystal layer 230, and polarization filters 211, 212 attached to both sides of the electrode glass sheets 221, 222.

The first front polarization filter 111 having a polarization angle of 90 degrees is attached to the front surface of the first LCD panel 101 of the first display device 100. An English character "A" is indicated on the first front polarization filter 111. The first rear polarization filter 112 having a polarization angle of 0 degree is attached to the rear surface of the first LCD panel 101, which is opposite to the backlight. An English character "H" is indicated on the first rear polarization filter 112.

The second front polarization filter 211 having a polarization angle of 90 degrees is attached to the second LCD panel 201 of the second display device 200, which is a surface opposite to the backlight 202. An English character "A" is indicated on the second front polarization filter 211. The second rear polarization filter 212 having a polarization angle of 0 degree is attached to a surface directing toward the half mirror. An English character "H" is indicated on the second rear polarization filter 212. As described above, the second display device 200 has a structure in which the LCD panel 101 of the first display device 100 is rotated 180 degrees and then coupled to the backlight. In other words, since the front and rear surfaces of the LCD panel are reversed, the surface on which the English character "H" was indicated, which was the rear surface opposite to the backlight, in the first display device 100 becomes the surface directing toward the half mirror 300, which is a surface opposite to the backlight in the second display device 200.

A method of fabricating the stereoscopic imaging device constructed above according to a first embodiment of the present invention is described below.

The stereoscopic imaging device according to a first embodiment of the present invention includes the two LCD panels 101, 201, and the half mirror 300 disposed between the two panels 101, 201.

The first LCD panel 101 having the first front polarization filter 111 and the first rear polarization filter 112 is first disposed on one surface of the stereoscopic imaging device so that the first front polarization filter 111 is directed towards an inner surface of the stereoscopic imaging device, that is, the direction of the half mirror 300.

The second LCD panel 201 is disposed at an angle of 90 degrees with respect to the first LCD panel 101.

The second front polarization filter 211 and the second rear polarization filter 212 of the second LCD panel 201 have polarization angles of the same pattern as that of the first front polarization filter 111 and the first rear polarization filter 112 of the first LCD panel 101, respectively. When the second LCD panel 201 is disposed, the second LCD panel 201 is rotated 180 degrees in the state where the top and bottom of the second LCD panel 201 remain intact so that the second rear polarization filter 212 is directed towards the half mirror 300.

Consequently, the first LCD panel 101 is installed such that the first rear polarization filter 112 is opposite to the first backlight 102 and the first front polarization filter 111 is directed towards the half mirror 300. The second LCD panel 201 is installed such that the second front polarization filter 211 is opposite to the second backlight 202 and the second rear polarization filter 212 is directed towards the half mirror 300. Accordingly, the stereoscopic imaging device is configured so that the first display device 100 is disposed at an angle of 90 degrees with respect to the second display device 200, which is fabricated so that the front and rear surfaces of the LCD panel used in the first display device 100 are turned over and then coupled to the backlight. In this state, the half mirror 300 is disposed between the first display device 100 and the second display device 200. The LCD panel of the second display device 200 is rotated 180 degrees with its top and bottom remaining intact. Thus, a display direction of left and right images of the second display device is opposite to that of left and right images of the first display device. Accordingly, an additional image mirror circuit is not needed.

MODE FOR THE INVENTION

FIG. 5 is a view illustrating a construction of a stereoscopic imaging device according to a second embodiment of the present invention.

Referring to FIG. 5, the stereoscopic imaging device according to a second embodiment of the present invention includes a first display device 100', a second display device 200', and a half mirror 300 disposed between the display devices 100', 200'.

In a second embodiment of the present invention, front and rear surfaces of a polarization filter attached to a LCD panel of the first display device 100' have polarization angles of 45 degrees and 135 degrees, or 135 degrees and 45 degrees. Thus, they have different polarization angles of the polarization filter in which the front surface is 90 degrees and the rear surface is 0 degree or the front surface is 0 degree and the rear surface is 90 degrees as in the first embodiment. This is true of the second display device 200'.

However, the second embodiment has the same construction and fabrication method as those of the first embodiment except for the polarization angles of the polarization filter and, therefore, description thereof will be omitted.

In the stereoscopic imaging device according to a second embodiment of the present invention, the second display device is of a type in which only the LCD panels are rotated 180 degrees with its top and bottom remaining intact in the first display device. Accordingly, the orthogonal polarization condition can be satisfied while using two display devices having the LCD panels of the same method, and an additional image mirror circuit is not necessary.

Although the constructions and operations of the present invention have been described with reference to the drawings, they are only illustrative. It is evident that various modifications and additions are possible without departing from the technical spirit and scope of the present invention.

INDUSTRIAL APPLICABILITY

The stereoscopic imaging device constructed above according to the present invention can be used as a 3D monitor of a computer and can also be used in a stereoscopic image display device of game machine or a variety of 3D display device.

The invention claimed is:

1. A method of fabricating a stereoscopic imaging device using two LCD panels and a half mirror disposed between the LCD panels, the method comprising:

a first step of disposing a first LCD panel having a first front polarization filter and a first rear polarization filter on one surface of the stereoscopic imaging device so that the first front polarization filter is directed towards the half mirror;

a second step of disposing a second LCD panel at a predetermined angle with respect to the first LCD panel, wherein the second LCD panel has a second front polarization filter and a second rear polarization filter having polarization angles of the same pattern as that of the first front polarization filter and the first rear polarization filter of the first LCD panel, respectively; and a third step of disposing a half mirror between the first LCD panel and the second LCD panel, wherein the second step comprises disposing the second LCD panel by rotating the second LCD panel 180 degrees with its top and bottom remaining intact so that the second rear polarization filter is directed towards the half mirror direction.

2. The method of claim 1, wherein:

the second step comprises disposing the second LCD panel at an angle of 90 degrees with respect to the first LCD panel, and the third step comprises disposing the half mirror so that the half mirror form an angle of 45 degrees with respect to the first LCD panel and the second LCD panel, respectively.

3. The method of claim 2, wherein the first step comprises using a polarization filter having a polarization angle of 90 degrees as the first front polarization filter, and a polarization filter having a polarization angle of 0 degree as the first rear polarization filter.

4. The method of claim 2, wherein the first step comprises using a polarization filter having a polarization angle of 135 degrees as the first front polarization filter, and a polarization filter having a polarization angle of 45 degree as the first rear polarization filter.

5. The method of any one of claims 1 to 4, further comprising the step of transmitting the same picture signal input to the first display device and the second display device in order to show a stereoscopic image to a user.

* * * * *